(12) United States Patent
Grizzard (10) Patent No.: US 7,200,597 B1
(45) Date of Patent: Apr. 3, 2007

(54) GRAPHIC SEARCH INITIATION

(75) Inventor: Michael R. Grizzard, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 341 days.

(21) Appl. No.: 10/125,275

(22) Filed: Apr. 18, 2002

(51) Int. Cl.
G06F 17/30 (2006.01)

(52) U.S. Cl. ............... 707/10; 707/3; 715/513

(58) Field of Classification Search .......... 707/3, 707/10, 104.1; 715/513
See application file for complete search history.

(56) References Cited

U.S. PATENT DOCUMENTS

| | | | |
|---|---|---|---|
| 5,804,803 A | | 9/1998 | Cragun et al. |
| 6,055,543 A | * | 4/2000 | Christensen et al. ..... 707/104.1 |
| 6,115,717 A | | 9/2000 | Mehrotra et al. |
| 6,154,738 A | * | 11/2000 | Call ............................. 707/4 |
| 6,199,081 B1 | | 3/2001 | Meyerzon et al. |
| 2001/0047298 A1 | * | 11/2001 | Moore et al. ................. 705/14 |
| 2002/0016725 A1 | * | 2/2002 | Eichstaedt et al. ............. 705/7 |
| 2002/0055955 A1 | * | 5/2002 | Lloyd-Jones et al. ....... 707/512 |

OTHER PUBLICATIONS

Brickley, Dan; "RDF for self-describing images", last updated Jan. 23, 2001, <http://www.tasi.ac.uk/2000/09/rdfmeta/>.*

Dan Brickley, "RDF for self-describing images", last updated Jan. 23, 2001, <http://www.tasi.ac.uk/2000/09/rdfmeta/>.*

Guha, R. V. et al., "Enabling Inferencing," WC3 Query Languages Meetings, Nov. 18, 1998.

"Describing and Retrieving Photos Using RDF and HTTP," W3C Note, Sep. 28, 2000.

Brickley, D., "RDF for Self-Describing Images," ILRT and TASI, last updated Jan. 23, 2001.

"Embedded Metadata," printed from http://www.w3.org/Conferences/WWW4/Papers/53/gg-meta.html on Aug. 8, 2002.

Bekker, H. et al., "Inventory of Metadata for Multimedia," SURFnet, Sep. 2000.

* cited by examiner

*Primary Examiner*—Leslie Wong
(74) *Attorney, Agent, or Firm*—Potomac Patent Group PLLC (57) ABSTRACT

A system for retrieving information. The system has a storage unit for storing an image that includes first and second selectable objects. The first selectable object is associated with a first metadata and the second selectable object is associated with a second metadata. The system also includes a visual output device and a processor that communicates with the visual output device and the storage unit to read the first and second metadata. The system also includes a user input device that communicates with the processor and instructs the processor to read the first and second metadata and display the first and second metadata on the visual output device.

13 Claims, 6 Drawing Sheets

GRAPHIC SEARCH INITIATION

BACKGROUND OF THE INVENTION

A common problem that users encounter when searching for information resources is how to choose keywords for input to a search engine. One particularly perplexing problem occurs when a user wants to search for items for which the user has seen but has no text-based information from which to formulate a search. For example, while browsing the web, a user may see a jacket for which the user wants more information. Unless the jacket is the subject of an advertisement, the user will have great difficulty formulating a query without knowledge of, for example, the manufacturer. Even if the user could identify the manufacturer, searching for additional information about a particular product among similar products offered by that manufacturer can be time-consuming and frustrating. Accordingly, a system and method is needed to solve this problem.

SUMMARY OF THE INVENTION

One embodiment of the present invention is directed to a system for retrieving information. The system comprises a storage unit for storing an image that includes first and second selectable objects. The first selectable object is associated with a first metadata and the second selectable object is associated with a second metadata. The system also includes a visual output device and a processor that communicates with the visual output device and the storage unit to read the first and second metadata. The system also includes a user input device that communicates with the processor and instructs the processor to read the first and second metadata and display the first and second metadata on the visual output device.

DESCRIPTION OF THE FIGURES

For the present invention to be understood clearly and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention while eliminating, for purposes of clarity, other elements. For example, certain details relating to the operation and design of a network capable of carrying hypertext traffic, such as the Internet, the specifications of hypertext protocols, such as HTTP, for use in transporting HTML pages, and the construction of a browser with plug-in extensibility, such as Internet Explorer, are not described herein. Those of ordinary skill in the art will recognize, however, that these and other elements may be desirable in an interactive networked environment. A discussion of such elements is not provided because such elements are well known in the art and because they do not facilitate a better understanding of the present invention.

One embodiment of the present invention relates to a system and method that allow a user of a web browser to select a digitized still image or motion video, or a portion thereof, and automatically formulate a search query for information resources associated with the selected image, video or the selected portion. Accordingly, the term "image," as used herein, refers to either a still image or a video frame within a stream of video frames. Specifically, the systems and methods described herein relate to images with an enhanced data set referred to as "metadata." For a general understanding of the features of the present invention, reference is made to the drawings, wherein like reference numerals have been used throughout to identify similar elements.

Figure 1:
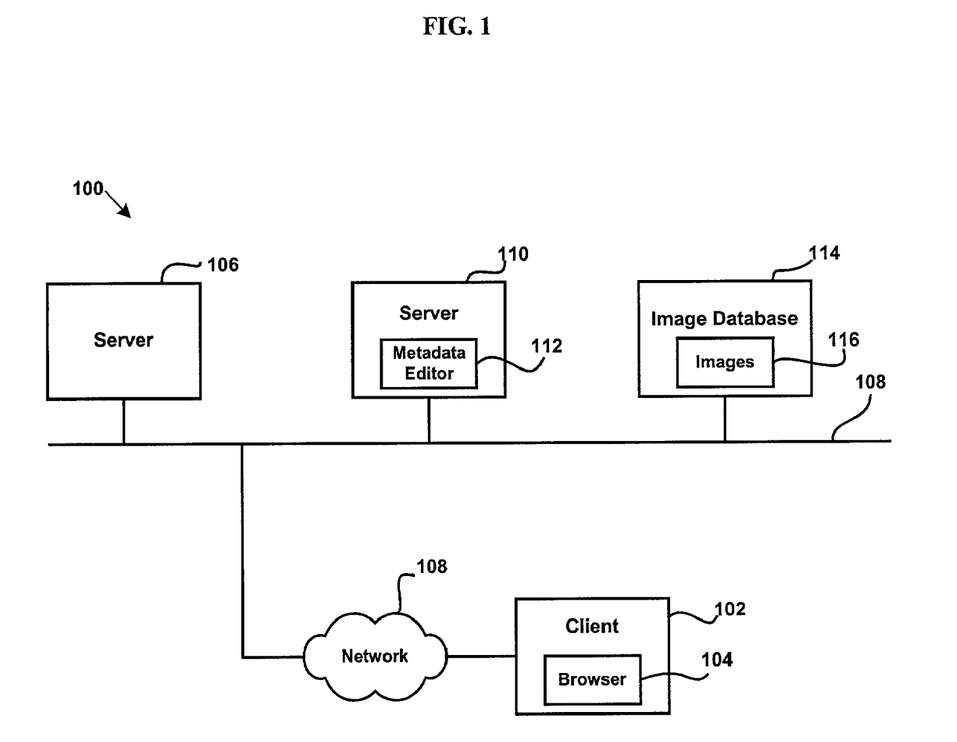
FIG. 1 is a functional block diagram of a data processing system for hosting web pages according to one embodiment of the present invention.

FIG. 1 illustrates a networked system architecture 100 in which the present invention operates according to one embodiment of the present invention. System 100 includes a client computer 102 connected to a remote server computer 106 over a computer network 108. Client 102 includes an HTTP browser application program 104 operating thereon, which may be any application program that allows for multimedia presentation of information, including text, images, sound, and video clips such as Netscape Navigator, Microsoft Internet Explorer or an equivalent. System 100 also includes a server 110, with a metadata editing application program 112 operating thereon, connected to remote server 106 over network 108. An image database server 114, also connected to network 108, stores images or other multimedia files 116. Metadata editor 112 is an application program designed to attach or otherwise associate metadata to the images 116. Image database 114 is a any body of information that is organized so that it can be retrieved, stored and searched in a coherent manner by a "database engine"—i.e. a collection of software methods for retrieving or manipulating data in the database. For example, image database server 114 may be a relational, object-oriented, or object-relational database.

It is understood that computer network 100 illustrated in FIG. 1 is exemplary, and alternative configurations may also be used in accordance with the invention. For example, network 108, as those skilled in the art will understand, may be any suitable computer network including, for example, a metropolitan area network, and/or various "Internet" or IP networks such as the World Wide Web, a private Internet, a secure Internet, a value-added network, a virtual private network, an extranet, or an intranet. Other suitable networks may contain other combinations of servers, clients, and/or peer-to-peer nodes. The present invention may also be practiced in distributed computing environments where tasks are performed by remote processing devices that are linked through a communications network. In a distributed computing environment, program modules may be located in both local and remote memory storage devices.

Network 108 may include communications or networking software such as the software available from Novell, Microsoft, Artisoft, and other vendors. A larger network, such as a wide area network (WAN), may combine smaller network(s) and/or devices such as routers and bridges, large or small, and the networks may operate using TCP/IP, SPX, IPX, and other protocols over twisted pair, coaxial, or optical fiber cables, telephone lines, satellites, microwave relays, modulated AC power lines, physical media transfer, and/or other data carrying transmission "wires" known to those of skill in the art. For convenience "wires" includes infrared, radio frequency, and other wireless links or connections.

Figure 2:
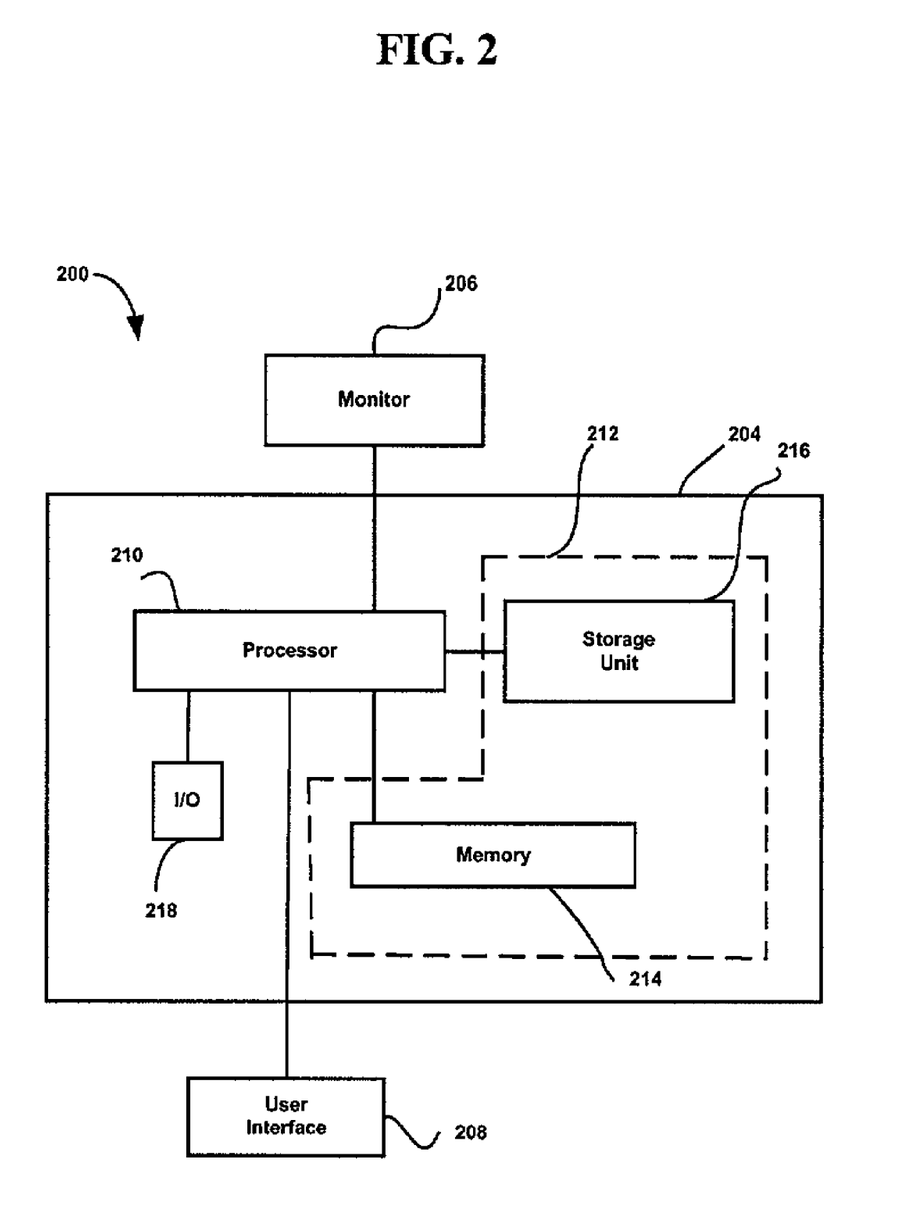
FIG. 2 is a functional block diagram of various hardware components of an information processing system used in accordance with one embodiment of the present invention.

FIG. 2 is a block diagram that illustrates various hardware components of an information processing system 200 used in accordance with the present invention. Information processing system 200 is representative hardware of client 102, client 110, or server 106. System 200 may be any network-enabled device such as, for example, a personal computer, a programmable digital assistant (PDA), a mainframe, a workstation, a laptop computer, a hand-held computing device, or combinations thereof. System 200 can optionally include, for example, a processing unit 204, a monitor 206, and a user interface 208. Processing unit 204 includes a processor 210 in communication with a memory 212 (shown in phantom) that, in turn, includes a volatile memory 214 and a storage unit 216. These are representative components of a computer whose operation is well understood.

Processor 210 may include a general purpose device such as an Intel Pentium® processor or other "off-the-shelf" microprocessor. Processor 210 may include a special purpose processing device such as, for example, an ASIC, PAL, PLA, PLD or other customized or programmable device. Memory 212 may include, for example, a static RAM, a dynamic RAM, a flash memory, a ROM, a CD-ROM, a disk, a tape, a magnetic, optical, or another computer storage medium. User interface 208 may include, for example, a keyboard, a mouse, a touch screen, a light pen, a tablet, a microphone, a position sensor, a pressure sensor, a thermal sensor, or other input hardware with accompanying firmware and/or software. Monitor 206 or other type of display device is connected to processor 210 via an interface, such as a video adapter.

System 200 may also include a computer readable medium having executable instructions or data fields stored thereon, such as storage unit 216. The computer readable medium can be any available medium that can be accessed by a general purpose or special purpose computer. By way of example, and not limitation, such a computer readable medium can comprise RAM, ROM, electrically erasable programmable read only memory (EEPROM), CD-ROM or other optical disk storage, magnetic disk storage or other magnetic storage devices, or any other medium that can be used to store desired executable instructions or data fields and that can be accessed by a general purpose or a special purpose computer.

The computer readable medium tangibly embodies a program, functions, and/or instructions that cause the computer system to operate in a specific and predefined manner as described herein. Those skilled in the art will appreciate, however, that the process described below may be implemented at any level, ranging from hardware to application software and in any appropriate physical location. For example, the present invention may be implemented as software code to be executed by system 200 using any suitable computer language such as, for example, microcode, and may be stored on any of the storage media described above, or can be configured into the logic of system 200. According to another embodiment, the instructions may be implemented as software code to be executed by system 200 using any suitable computer language such as, for example, Java, Pascal, C++, C, Perl, database languages, APIs, various system-level SDKs, assembly, firmware, microcode, and/or other languages and tools.

FIG. 2 and the foregoing discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Additionally, those skilled in the art will appreciate that the present invention is not limited to a particular computer system platform, processor, operating system, or network.

Figure 3:
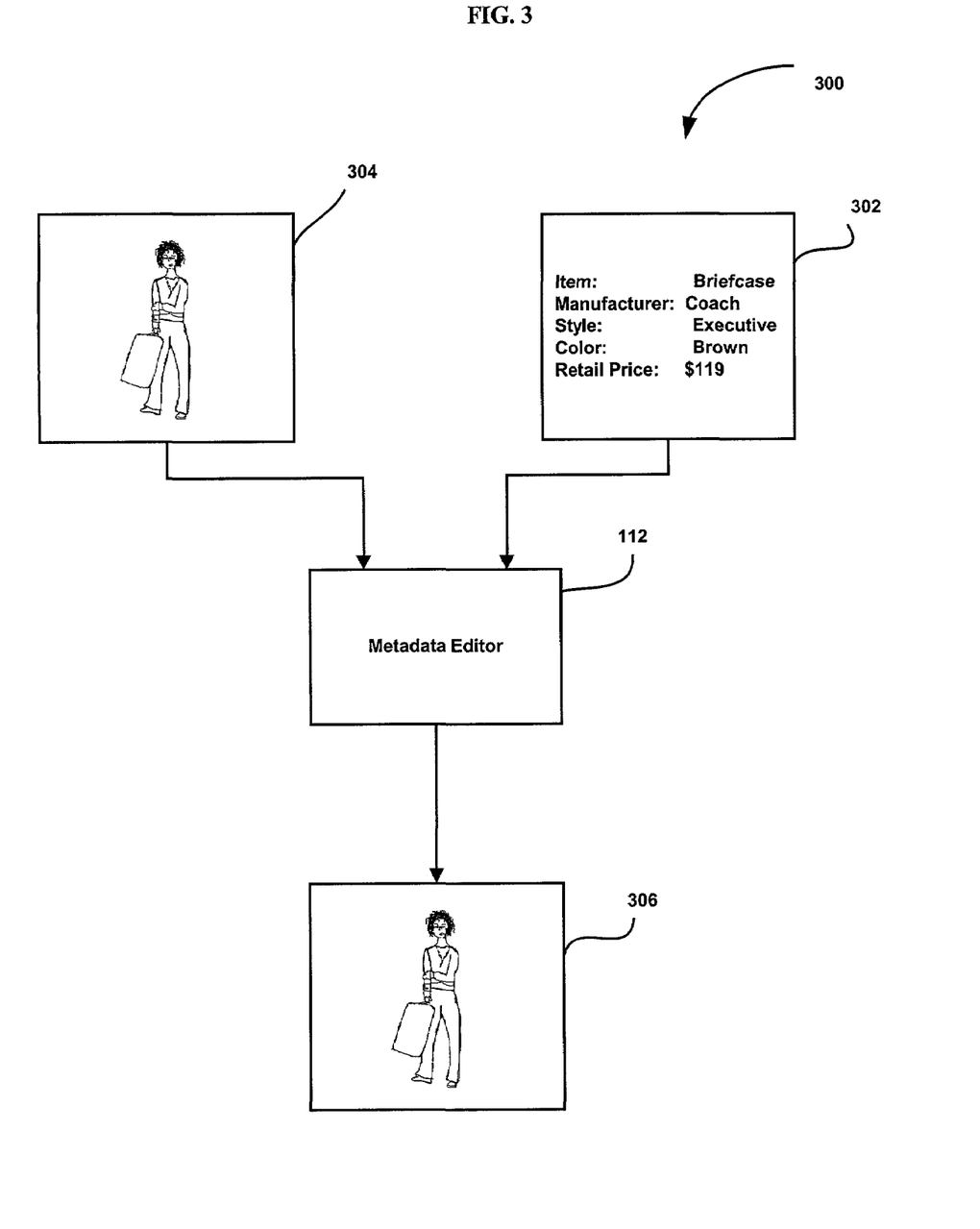
FIG. 3 is a combination flow chart and logical block diagram that illustrates the formation of a metadata-enabled image according to one embodiment of the present invention.

FIG. 3 illustrates a process 300 in which metadata editor 112 combines a set of metadata 302 with an image 304 to produce a metadata-enabled image 306 according to an embodiment of the present invention. Metadata editor 112 combines metadata 302 with image 304 using, for example, the Resource Description Framework (RDF) and extensible Markup Language (XML) in a manner known to those skilled in the art. RDF is an interoperable standard for metadata on the web defined by the World Wide Web Consortium (W3C). Document Type Definitions (DTDs) may also be used with XML to create a suitable metadata model. Using these standards, any web image, ranging from gas grills to footwear, can be associated with metadata to conveniently display rich content about the image.

Figure 4:
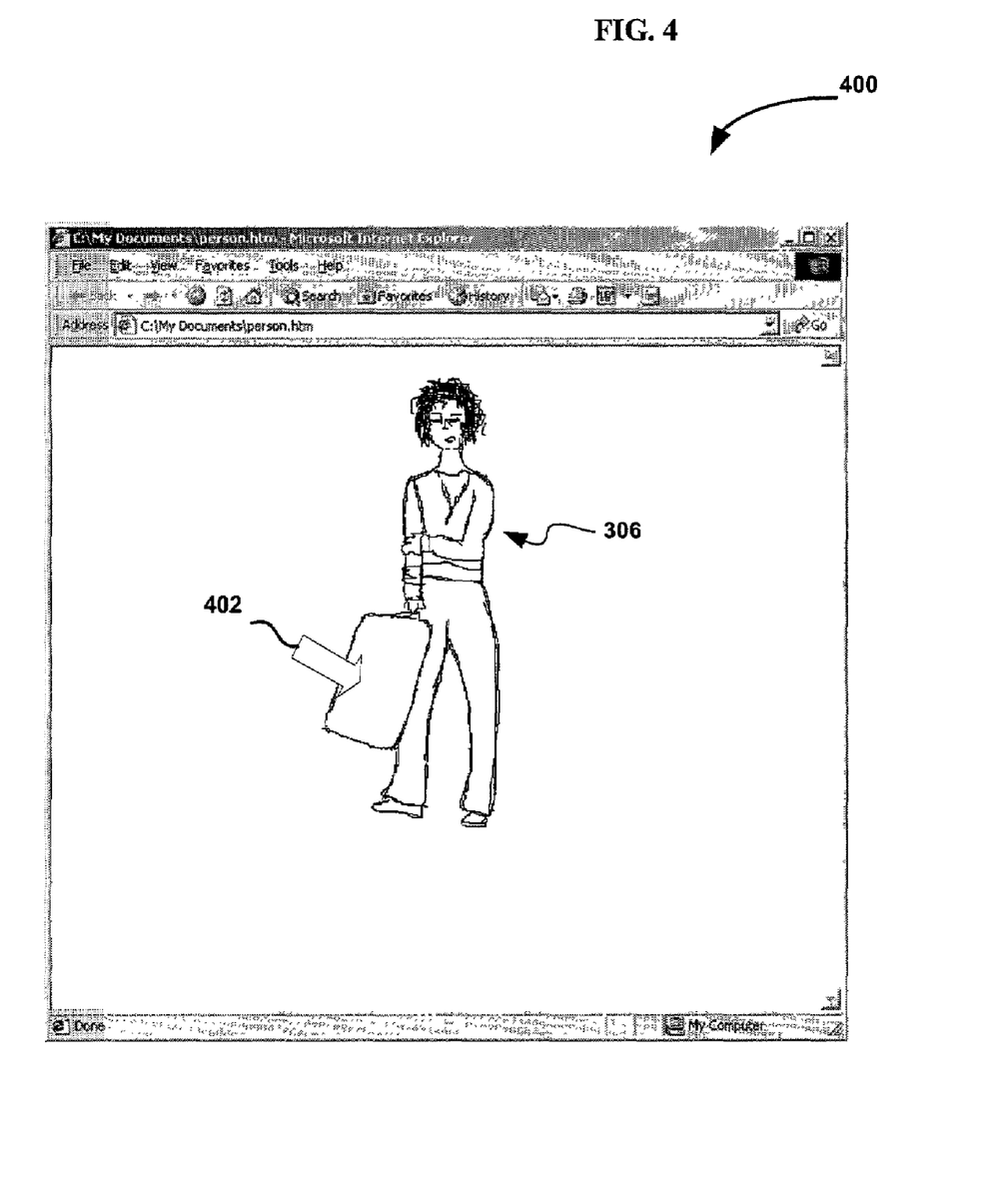
FIG. 4 illustrates a web page that includes a metadata-enabled image displayed thereon in accordance with one embodiment of the present invention.

FIG. 4 illustrates a web page 400 that includes metadata-enabled image 306 displayed thereon and in accordance with one embodiment of the present invention. Web page 400 may also display a cursor 402 that may be controlled by user input, as described above. The user may utilize cursor 402 to select an image within web page 400, such as metadata-enabled image 306. According to one embodiment, the user positions cursor 402 over metadata-enabled image 306 and clicks on the image 306 using a right-hand button on a pointing device to indicate, for example, a request for context-sensitive action.

According to one embodiment, the context-sensitive action produces a user interface control that may include, for example, a pop-up window having a list of options related to image 306 and its associated metadata 302. Those of skill in the art will realize that such user interface selection controls may be implemented using, for example, an ActiveX control, a Java control, an applet, or a browser plug-in, or a separate software application. The list of options related to metadata 302 may include, for example, launching a suitable metadata extraction tool to view metadata 302.

According to another embodiment, the list of options associated with the context sensitive action may include automatically inserting the metadata into a search engine. According to such an embodiment, a search is automatically initiated to locate resources, such as web sites, within a distributed environment. For example, the user may designate a search engine as a user preference before initiating the context-sensitive action. Example of such search engines include Google™, offered by Google of Mountain View, Calif., which may be accessed at the google.com URL and RealPages, offered by BellSouth, which may be accessed at realpages.com URL. Once the user designates the search engine, the present invention may be used to automatically insert metadata 302 into the search engine as search terms. According to one embodiment, the present invention may launch a new browser window that displays the search engine with metadata 302 entered as search terms and allows the user to edit the terms before initiating the search. According to another embodiment, the search is initiated immediately from the context-sensitive action. The search engine examines the search criteria and returns a list of web documents to browser 104 at the client computer 102 that conform to the search criteria and that may be desired by the user.

Figure 5:
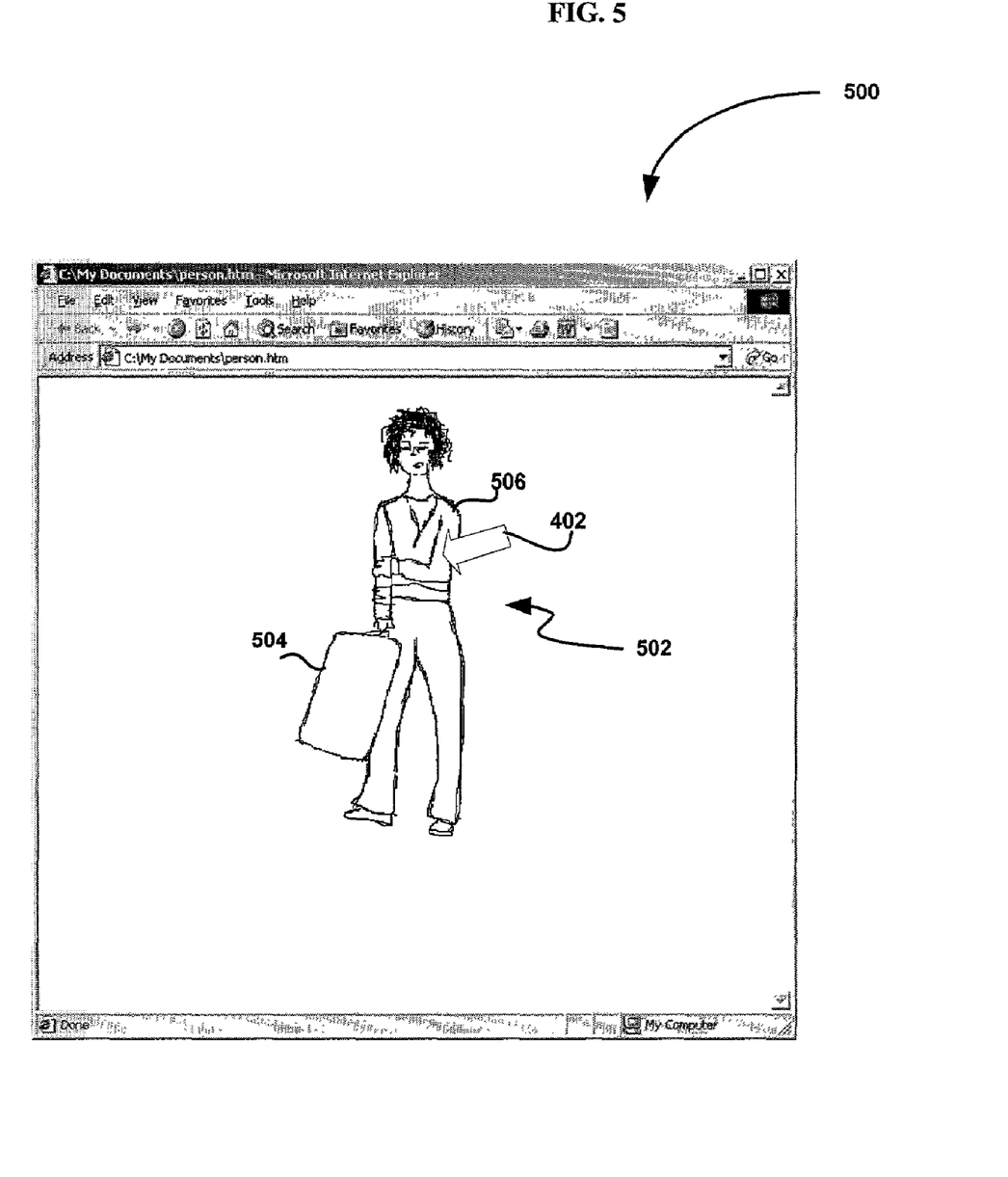
FIG. 5 illustrates a web page that includes discrete selectable objects displayed thereon according to one embodiment of the present invention.

FIG. 5 illustrates a web page 500 that includes an exemplary metadata-enabled image 502 displayed thereon and in accordance with an embodiment of the present invention. Image 502 includes multiple discrete selectable objects 504 and 506. Each selectable object has a unique set of metadata associated with it. Accordingly, the user can access metadata associated with any selectable object in the scene. It should be understood that web pages 400 and 500 are merely exemplary of the displays and methods that may be used to select and access metadata associated with an image. Thus, any suitable display and method of displaying images may be used in accordance with the present invention.

Figure 6:
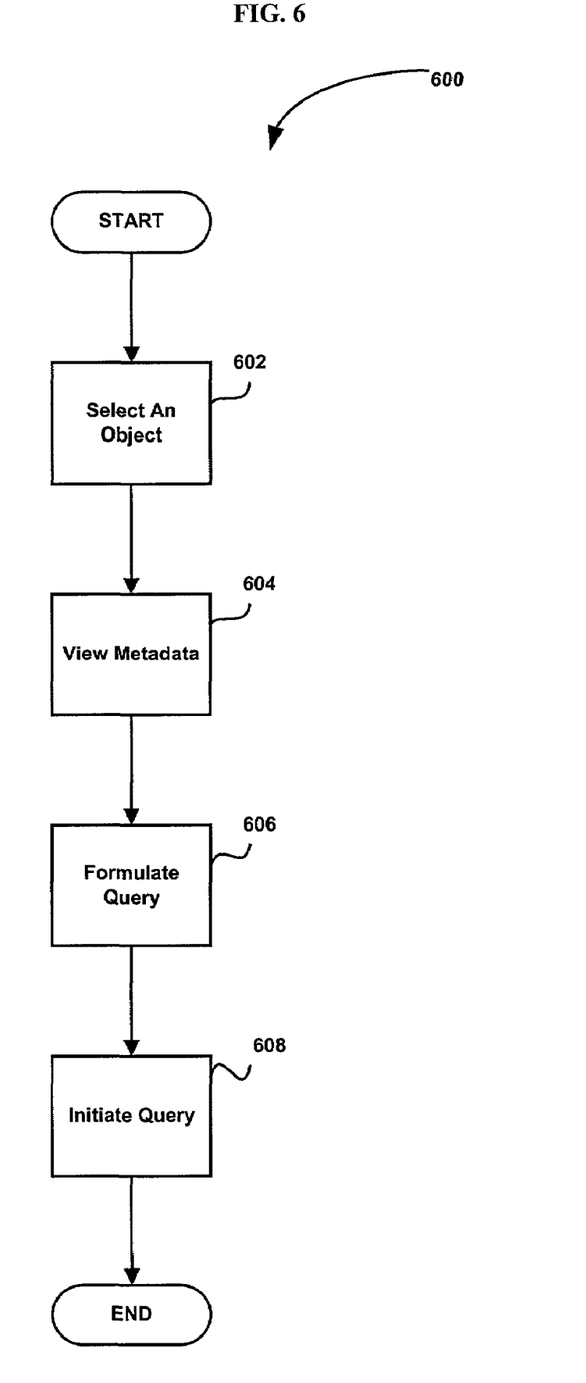
FIG. 6 is an exemplary flow diagram that illustrates a process in which a user utilizes the present invention to access rich content about an image.

FIG. 6 is an exemplary flow diagram that illustrates a process 600 in which a user uses the present invention to access rich content about an image. The process begins at step 602 in which a user at client 102 directs browser 104 to display, for example, web page 500 that includes an image 502. As explained above, metadata is attached to and/or associated with selectable objects 504 and 506 within the image 502. To view metadata about object 504 (a woman's jacket), in step 604, the user clicks on object 504 using, for example, a right-hand button on the pointing device and selects among a list of user options. In step 606, according to one embodiment, the present invention inserts the metadata associated with selectable object 504 into a predetermined search engine. Finally, in step 608, according to another embodiment, the present invention automatically initiates the search using metadata as input.

It should be understood that the present invention is not limited by the foregoing description, but embraces all such alterations, modifications, and variations in accordance with the spirit and scope of the appended claims.

What is claimed is:

1. A system for retrieving information, comprising:
 a storage unit for storing an image, wherein the image comprises first and second selectable objects, and wherein the first selectable object is associated with a first metadata and the second selectable object is associated with a second metadata;
 a metadata editor to associate the first metadata with the first selectable object and to associate the second metadata with the second selectable object, wherein at least one of the first metadata and the second metadata is associated according to a metadata model formed with extensible Markup Language and Document Type Definitions;
 a visual output device;
 a processor in communication with the visual output device and the storage unit for reading the first and second metadata;
 a user input device in communication with the processor for instructing the processor to read the first and second metadata and display the first and second metadata on the visual output device; and
 a search engine in communication with the processor for receiving the first metadata whenever the user input device instructs the processor to read the first metadata associated with the first selectable object, wherein the search engine automatically initiates a search upon receiving the first metadata, and the search is based on the first metadata.

2. The system of claim 1, wherein the first metadata conforms to a schema expressed in accordance with a Resource Description Framework (RDF) and Syntax Specification.

3. A method for retrieving information from a computer system, comprising:
 selecting an object from among a plurality of selectable objects within a viewing plane of a viewing device;
 associating each of the plurality of selectable objects with respective metadata;
 reading metadata associated with the selected object in the computer system, wherein the metadata is associated with the selected object according to a metadata model formed with extensible Markup Language and Document Type Definitions;
 transferring the metadata to a search engine, wherein transferring the metadata to a search engine includes the search engine's reading transferred metadata associated with the selected object and automatically initiating a search upon receiving the transferred metadata using transferred metadata through the computer system; and
 displaying a result of the search on the viewing device.

4. The method of claim 3, wherein the selectable object is part of an image.

5. The method of claim 3, further comprising displaying the metadata associated with the selected object.

6. The method of claim 3, wherein the metadata conforms to a schema expressed in accordance with a Resource Description Framework (RDF) and Syntax Specification.

7. A system for retrieving information, comprising:
 means for selecting an object from among a plurality of selectable objects within a viewing plane of a viewing device;
 means for associating each of the selectable objects with respective metadata;
 a processor for reading metadata associated with the selected object, wherein the metadata is associated with the selected object according to a metadata model formed with extensible Markup Language and Document Type Definitions; and
 means for transferring the metadata to a search engine in communication with the processor, wherein transferring the metadata to a search engine includes the search engine's reading transferred metadata associated with the selected object and automatically initiating a search upon receiving transferred metadata using the transferred metadata.

8. The system of claim 7, wherein the selected object is part of an image.

9. A computer readable medium having stored thereon instructions which, executed by a processor, cause the processor to perform:
 selecting an object from among a plurality of selectable objects within a viewing plane of a viewing device;
 associating each of the plurality of selectable objects with respective metadata;
 reading metadata associated with the selected object, wherein the metadata is associated with the selected object according to a metadata model formed with extensible Markup Language and Document Type Definitions;

transferring the metadata to a search engine, wherein transferring the metadata to a search engine includes the search engine's reading transferred metadata associated with the selected object and automatically initiating a search upon receiving the transferred metadata using transferred metadata through the computer system; and displaying a result of the search on the viewing device.

10. The medium of claim 9 wherein the selected object is part of an image.

11. A method for preparing a searchable image in a computer system, comprising:

combining metadata with an image in the computer system;

wherein the metadata is descriptive of one or more objects displayed within the image, and the metadata is combined with the image according to a metadata model formed with extensible Markup Language and Document Type Definitions to support automatically initiating a search by a search engine based on the metadata;

associating at least a respective portion of the metadata with each of the one or more objects displayed in the image;

providing to a user an option relating to the metadata associated with each of the one or more objects in response to a context-sensitive action by the user, wherein the option is to insert the metadata into a search engine that automatically initiates a search upon receiving the inserted metadata, the search being based on the inserted metadata, and to display a result of the search.

12. The method of claim 11, wherein combining metadata with an image includes:

making selectable the one or more objects displayed with the image.

13. The method of claim 11, wherein providing an option to a user includes providing an option to view the metadata.

* * * * *